(12) United States Patent
Klinksiek et al.

(10) Patent No.: US 7,034,067 B1
(45) Date of Patent: *Apr. 25, 2006

(54) ADJUSTABLE JET DISPERSER FOR PRODUCING AQUEOUS TWO-COMPONENT POLYURETHANE PAINT EMULSIONS

(75) Inventors: Bernd Klinksiek, Bergisch Gladbach (DE); Dieter Schleenstein, Odenthal (DE); Wieland Hovestadt, Leichlingen (DE); Michael vom Felde, Langenfeld (DE)

(73) Assignee: Bayer Aktiengesellschaft, Leverkusen (DE)

(*) Notice: Subject to any disclaimer, the term of this patent is extended or adjusted under 35 U.S.C. 154(b) by 27 days.

This patent is subject to a terminal disclaimer.

(21) Appl. No.: 10/030,676

(22) PCT Filed: Jul. 12, 2000

(86) PCT No.: PCT/EP00/06599

§ 371 (c)(1),
(2), (4) Date: Jan. 11, 2002

(87) PCT Pub. No.: WO01/05860

PCT Pub. Date: Jan. 25, 2001

(30) Foreign Application Priority Data

Jul. 16, 1999 (DE) ................ 199 33 441

(51) Int. Cl.
*C08J 3/03* (2006.01)
*C09D 175/04* (2006.01)
*C08L 75/04* (2006.01)
*C08G 18/08* (2006.01)

(52) U.S. Cl. .............. 523/324; 427/421; 428/402; 524/591; 524/839; 524/840; 528/71; 528/502 C; 528/502 E; 528/502 F

(58) Field of Classification Search ............. 523/324; 427/421; 428/402; 524/591, 839, 840; 528/71, 528/502 C, 502 E, 502 F
See application file for complete search history.

(56) References Cited

U.S. PATENT DOCUMENTS

| | | | |
|---|---|---|---|
| 3,437,624 A | | 4/1969 | Dawn et al. ............ 524/591 |
| 3,706,320 A | * | 12/1972 | Kalsi ..................... 137/487 |
| 4,784,178 A | * | 11/1988 | Kasaya et al. ......... 137/554 |
| 4,921,842 A | * | 5/1990 | Henning et al. ........ 524/839 |
| 4,996,004 A | | 2/1991 | Bücheler et al. ....... 252/314 |
| 5,116,536 A | | 5/1992 | Bücheler et al. ....... 252/314 |
| 5,723,518 A | * | 3/1998 | Kahl et al. .............. 523/324 |

FOREIGN PATENT DOCUMENTS

EP 685 544 12/1995
GB 997974 * 7/1965

* cited by examiner

*Primary Examiner*—Rabon Sergent
(74) *Attorney, Agent, or Firm*—Joseph C. Gil; Thomas W. Roy

(57) ABSTRACT

The invention relates to a process for the production of aqueous two-component polyurethane lacquer emulsions, with variable throughput, and to the use thereof as high-quality lacquers and coatings.

4 Claims, 4 Drawing Sheets

ADJUSTABLE JET DISPERSER FOR PRODUCING AQUEOUS TWO-COMPONENT POLYURETHANE PAINT EMULSIONS

BACKGROUND OF THE INVENTION

The invention relates to a process for the production of aqueous two-component polyurethane lacquer emulsions, with variable throughput, and to the use thereof as high-quality lacquers and coatings.

Two-component polyurethane lacquers (2C-PUR lacquers) are not mixed until shortly before application, because of the limited processing time (working life) of the lacquers. Depending on the reactivity of the lacquer systems, the said working life may be from several minutes to several hours.

While such two-component systems have in the past been used in solution in organic solvents, a number of water-dispersible two-component systems have recently been developed. Water-dispersible two-component systems normally consist of a resin component containing hydroxyl groups (binder, polyol), and a polyisocyanate component (hardener, crosslinking agent). The hydroxy-functional resin component is generally present in the form of an aqueous dispersion, and the polyisocyanate component is generally in the form of an anhydrous one-hundred-percent component or is in solution in a solvent. Such systems, which can also be used within the scope of the present invention, are disclosed, for example, in EP-A 358 979, 496 205, 469 389, 520 266, 540 985, 542 105, 543 228, 548 669, 562 282 and 583 728. A disadvantage of those lacquer systems is that the known lacquer quality of two-component systems based on purely organic solvents is not achieved in some fields of application. That is true especially of fields of application in which particularly high optical properties and resistance properties are required.

In order to achieve lacquer surfaces of high quality, it is known to use lacquer dispersions the particle size of which is as small as possible. In aqueous two-component polyurethane lacquers, therefore, polyol dispersions having a sufficiently small particle size of less than 500 nm, preferably from 10 to 200 nm, are generally used. Dispersion of the isocyanate component, which is hydrophobic per se, does not take place until shortly before application of the lacquers, since the polyisocyanate component reacts with water and therefore has only a limited storage stability in the presence of water. Dispersion of the polyisocyanate component, which is hydrophobic per se, in the aqueous hydroxy-functional resin dispersion by means of conventional static mixing devices causes considerable difficulties, however. The reason is that the isocyanate component is stabilised during the emulsification at the surface of emulsion particles that have already formed, so that the superficial stabilising layer stands in the way of further division. Aqueous two-component polyurethane lacquer emulsions therefore normally have a bimodal particle size distribution, with a first distribution maximum at a particle size corresponding to the hydroxy-functional resin dispersion and a second distribution maximum at a particle size greater than 10,000 nm (isocyanate component), considerable portions having particle sizes greater than 20,000 nm still being present.

Polyisocyanates that have already been rendered hydrophilic by chemical modification and polyisocyanates containing external emulsifiers have also been developed; although such polyisocyanates permit markedly simpler dispersion to an average particle size of less than 1000 nm using static mixing devices, they yield hardened lacquer films that have resistance properties which are inadequate for many fields of application. Lacquer films having good resistance properties, however, are obtained only by the use of hydrophobic polyisocyanate components.

On the basis of the conception that the dispersibility of the isocyanate component is limited by the stabilisation reaction which takes place at the surface of particles that are already present, possible ways have been sought of achieving as finely divided a distribution as possible within periods of time which are so short that noticeable superficial stabilisation does not yet occur. In particular, warming which accelerates the reaction of the polyisocyanate component with water is also to be avoided during the dispersion.

In DE-A 19 510 651 it is described that, after pre-mixing of the hydroxy-functional binder dispersion with the polyisocyanate component, water, optionally additional solvent and, optionally, other lacquer auxiliaries known per se, the resulting pre-emulsion, of which no particular requirements are to be made, is forced at high pressure through a nozzle having small measurements in at least one dimension. There are mentioned as homogenising nozzles slit-type nozzles, circular-slot nozzles or hole-type nozzles. Special preference is given to the use of a jet disperser according to EP-A-101 007, since very finely divided dispersions are formed even at relatively low pressures. The pressure to be applied is to be from 1 to 30 MPa (from 10 to 300 atmospheres), in the case of the jet disperser preferably from 1 to 8 MPa, especially from 2 to 6 MPa. By means of that emulsification it is possible to produce two-component polyurethane lacquer emulsions which are stable for several hours and which exhibit a considerably improved surface quality after application and hardening.

It is also possible to reduce the content of solvent in the dispersion considerably and preferably to dispense with rendering the polyisocyanate component hydrophilic. In particular, dispersions having a solvent content of less than 15% can readily be produced in accordance with the invention. Depending on the pressure applied during the dispersion, the number of nozzle passages and the two-component system used, it is also possible to produce emulsions that are completely free of solvents and agents imparting hydrophilicity.

The high lacquer surface qualities achievable with the process according to the invention can be related directly to the particle size distribution of the emulsions.

In DE-A 19 510 651, the use of the jet disperser having fixed dimensions is described in FIGS. 1, 2, 3, 4 and 5. FIG. 6 describes a particular form in which the bores are freed or closed off by a movable application pipe. This form has proved to be impractical for use. It has been found that such homogenising nozzles must be adjustable very rapidly in fractions of a second in order to produce the same emulsion quality continuously when the amounts deposited vary.

It has been found that motor vehicle bodies, for example, can be lacquered especially advantageously at a very high quality if the polyisocyanate is continuously emulsified in the aqueous polyol component immediately before being introduced into the spray gun or atomiser bell. Problems arise, however, if the amount of lacquer taken varies within very short intervals of time owing to the geometry of the motor vehicle body.

The object of the invention was, therefore, to make available a mixing apparatus for aqueous two-component polyurethane lacquers having a high lacquer quality, which mixing apparatus continuously produces the same emulsion qualities when the amounts deposited vary.

Surprisingly, it has been possible to achieve that object by means of the embodiment of a jet disperser described in greater detail below.

SUMMARY OF THE INVENTION

The invention provides a process for the production of aqueous two-component polyurethane lacquer emulsions, with variable throughput, based on aqueous binder dispersions containing isocyanate-reactive groups and on polyisocyanates, by mixing the two components, characterised in that the mixture is pumped under a pressure of from 1 to 30 MPa through an adjustable jet disperser having nozzle bores or slots which can be connected through or shut off.

DETAILED DESCRIPTION OF THE INVENTION

According to the invention, a mixing nozzle (1) for the polyisocyanate is advantageously provided immediately upstream of the jet disperser (FIG. 1) and the crude emulsion is produced by injection into the polyol component. Immediately downstream there is provided a further screen (2), which ensures that the crude emulsion is of good quality and prevents coarse fractions.

In an embodiment of the invention shown in FIG. 1, the apparatus includes a ceramic sleeve (3) an open end (13), and bores (4) and/or slots in the wall thereof, where the bores (4) and/or slots communicate with one end of a pipe (15), which has an open end remote from the end communicating with the bores (4) and/or slots. The ceramic sleeve (3) also has a moveable ceramic piston (5) located opposite the open end (13). The movement of the moveable ceramic piston (5) is such that the bores or slots can be partially closed, enabling flow therethrough or completely closed. The movement of the moveable ceramic piston (5) can be caused either via a pneumatic drive (9) or an electric step motor. A polyurethane coating emulsion mixture can be pumped into the open end (13) of the ceramic sleeve (3), through the bores (4) and/or slots, and through the pipe (15) as shown by the arrows in FIG. 1. Alternatively, the flow may be reversed and the polyurethane coating emulsion mixture can be pumped into the pipe (15), through the bores (4) or slots and through the ceramic sleeve (3).

The core element of the apparatus according to the invention is a ceramics sleeve (3) having the homogenising bores (4) and the ceramics piston (5). It has been found that the ceramics components must be ground in to fit very accurately in order to avoid leakage between the piston and the sleeve. It has been found that components made of steel do not permit a tight seal and thus allow individual bores to be connected through. It has also been found that the bores at the inlet side should be ground with very sharp edges. Suitable ceramics materials are metal oxides such as, for example, zirconium oxide or even harder materials. It has also proved advantageous to provide a flushing bore (6), which permits a large mass flow on flushing. Flow through the ceramics sleeve may be either from the inside to the outside or from the outside to the inside. In order to avoid a film of lacquer on the piston when the apparatus is at a standstill, a flushing lantern (7) can be installed. By means of pressure regulation (8), for example via a pneumatic drive (9), adjustment is possible in fractions of a second, in order to connect through or shut off the required number of nozzles to ensure that the homogenising pressure and hence the emulsion quality are always the same. If electric step motors are used, adjustment within the ms range is also possible. Almost step-free adjustment is achieved according to FIG. 2 if two opposing rows of nozzles are offset relative to each other.

It has been found to be especially advantageous if, in accordance with FIG. 3, slots are used instead of the nozzles. It has been found that, if the slots are only as wide as the bore diameter, or even smaller, a very constant operation and linear, completely step-free adjustment is possible. With the apparatus according to the invention it is possible to produce two-component polyurethane lacquers of the highest quality and with a large adjustment range.

The geometry of the bores and slots is to be such that energy densities of from $10^5$ to $10^7$ W/cm$^3$, preferably from $10^6$ to $10^7$ W/cm$^3$, are achieved. That is achieved if, in accordance with FIGS. 2 and 3, the amount of material removed in the region of the bore or of the slot is such that the length of the bore is from 1 to 3 times as long as the diameter of the bore or the width of the slot. Especially preferably from 1 to 2 times as long.

The jet disperser that has been developed additionally has the advantage that an intermediate buffer and hence the outlay in terms of flushing when the apparatus is at a standstill can be minimised, if the polyisocyanate is continuously emulsified immediately before being introduced into the spray gun or atomiser bell.

FIG. 4 shows the embodiment according to the invention, for example, for the initial lacquering of motor vehicles. Polyol and polyisocyanate are pumped continuously and without pulsation to the mixing nozzle (2) and the adjustable jet disperser (3) via one or more metering pumps (1). The metering pumps also serve to apply the necessary pump pressure. After production of the emulsion, the two-component lacquer can be stored via a small buffer (4) for a plurality of atomising bells (5), if the lacquer is to be atomised with internal electrical charging. In the case of external electrical charging, it is possible to dispense with the buffers.

By means of the process according to the invention it is possible to produce, for example, bimodal aqueous two-component polyurethane lacquer emulsions based on hydroxy-functional resin dispersions and polyisocyanates, which have a particle size distribution having a first distribution maximum at a particle size of <500 nm, preferably from 10 to 200 nm, and a second distribution maximum at a particle size of from 200 to 2000 nm. The second distribution maximum is preferably at a particle size of from 300 to 1000 nm. The particle sizes of the distribution maxima differ at least by a factor of 2.

In particular, 99 wt. % of the particles in the emulsion according to the invention have a particle size of less than 5000 nm, preferably less than 1000 nm.

According to the invention, all binders and crosslinking components hitherto used for two-component polyurethane lacquers can be employed.

Suitable binder resins are, for example, polyacrylates, polyesters, urethane-modified polyesters, polyethers, polycarbonates or polyurethanes containing isocyanate-reactive groups, especially those in the molecular weight range of from 1000 to 10,000 g/mol. Hydroxyl groups are preferably used as the isocyanate-reactive groups. The binder resins are generally used in the form of aqueous dispersions.

There are suitable as the polyisocyanate component any organic polyisocyanates having aliphatically, cycloaliphatically, araliphatically and/or aromatically bonded, free isocyanate groups. In general, the polyisocyanate component is to have a viscosity of from 20 to 1000 mPa·s, preferably of less than 500 mPa·s. However, polyisocyanates having a higher viscosity may also be used if the viscosity of the polyisocyanate component is reduced by an appropriate solvent content.

It is especially preferred to use as the polyisocyanates those having exclusively aliphatically and/or cycloaliphatically bonded isocyanate groups having an average NCO functionality of from 2.2 to 5.0 and a viscosity of from 50 to 500 mPa·s at 23° C. At a correspondingly lower viscosity, dispersion is possible according to the invention with a sufficiently small particle size entirely without the addition of solvent.

It is also possible to use the conventional additives and modifying agents known in lacquer chemistry.

The process according to the invention is not tied to the use of component systems which have been developed specifically for water-dispersible lacquer systems, as described, for example, in the literature cited at the beginning. Rather, it is possible according to the invention to use a large number of the two-component systems which hitherto have not been dispersible in water. In general, however, where two-component systems developed specifically for dispersion in water are used in accordance with the invention, the outlay in terms of dispersion within the scope of the present invention (that is to say, the pressure to be applied) will be especially advantageous.

The emulsions obtained in the process according to the invention are suitable for the production of high-quality coatings on a wide variety of substrates and materials, such as wood, metals, plastics, etc. The coating systems are used preferably for the lacquering of bodies or body parts in the initial lacquering of motor vehicles.

EXAMPLES

Example 1

Continuous production of a paraffin oil emulsion having the following recipe:
4 parts of paraffin oil, highly liquid
1 part of emulsifier, Tween 80/Arlacel 80 mixture, HLB 11.5, and
5 parts of water.

In FIG. 5, the test results obtained with an adjustable hole-type nozzle according to FIG. 2 having 10 0.1 mm holes, with a slot-type nozzle having a width of 0.1 mm and a height of 6 mm, and with a jet disperser having fixed dimensions and having 2 0.1 mm bores, are compared by means of a graph.

For the adjustable nozzles, in each case the smallest openings, a middle setting and the maximum opening are recorded. The graph, which gives the average particle size as a function of the homogenising pressure, shows good correspondence over the entire range and the good functioning of the adjustable jet disperser.

Example 2

Continuous preparation of a two-component polyurethane lacquer according to the following recipe:

Binder component:

| | |
|---|---|
| Bayhydrol ® VP LS 2271 (hydroxy-functional polyacrylate dispersion, Bayer AG) | 30.39% |

-continued

| | |
|---|---|
| Bayhydrol ® VP LS 2231 (hydroxy-functional, urethane-modified polyester dispersion, Bayer AG) | 33.28% |
| Byk ® 345 lacquer auxiliary, Byk Chemie GmbH | 0.29% |
| Byk ® 333 lacquer auxiliary, Byk Chemie GmbH | 0.30% |
| distilled water | 7.65% |
| Hardener component: | |
| Desmodur ® VP LS 2025/1 (lacquer polyisocyanate, Bayer AG) | 18.29% |
| Tinuvin ® 1130, 50% in butyl diglycol acetate (light stabiliser, Ciba Spezialitätenchemie GmbH) | 1.85% |
| Tinuvin ® 292, 50% in butyl diglycol acetate (HALS stabiliser, Ciba Spezialitätenchemie GmbH) | 0.92% |
| butyl diglycol acetate/Solvesso 100 (1/1) | 7.03% |
| | 100.00% |

The two components are mixed in accordance with FIG. 4 using an adjustable jet disperser according to FIG. 1 having 0.2 mm hole-type nozzles according to FIG. 2, and the hardener component is emulsified.

The lacquer is applied electrostatically to galvanised steel sheets in a layer thickness of 40 µm by means of a commercially available bell. The lacquer film is exposed to air for 5 minutes at room temperature, pre-dried for 10 minutes at 80° C. and hardened for 30 minutes at 180° C. The lacquer film has the following performance properties:

| | |
|---|---|
| pendulum hardness according to König (23° C.) | 190 s |
| 20° shine | 88 |
| resistance to solvents xylene/motor fuel (0 = very good, 5 = poor) | 0/1 |
| resistance to chemicals pancreatin/sulfuric acid/sodium hydroxide solution | 2/1/0 |
| scratch resistance (Amtec Kistler laboratory washing line, 10 cycles), Δ shine | 13 |

Figure 1:
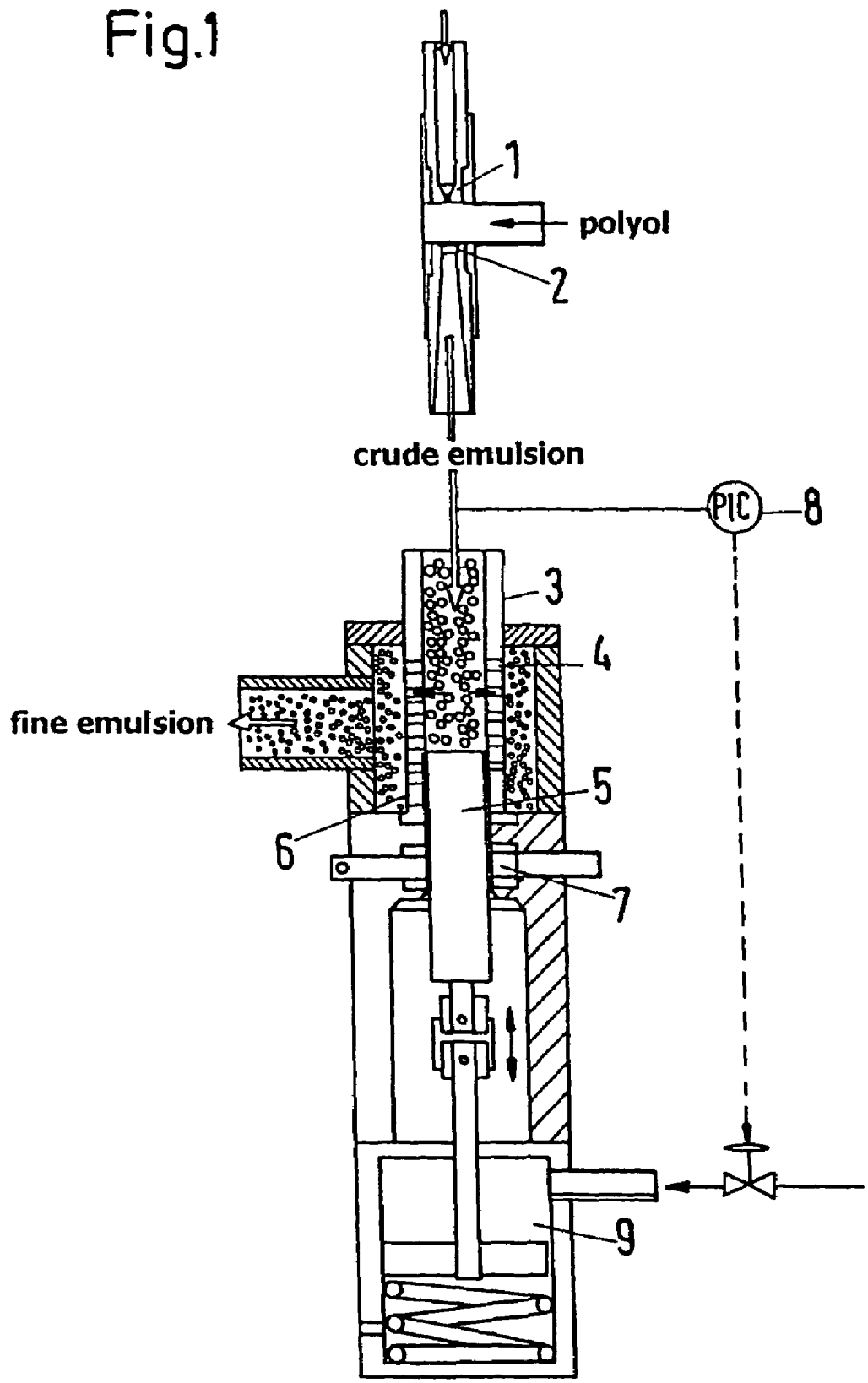
FIG. 1 describes one embodiment of the invention and shows a cross-section through a dispersing device according to the invention, with mixing nozzle connected upstream.
Figure 2:
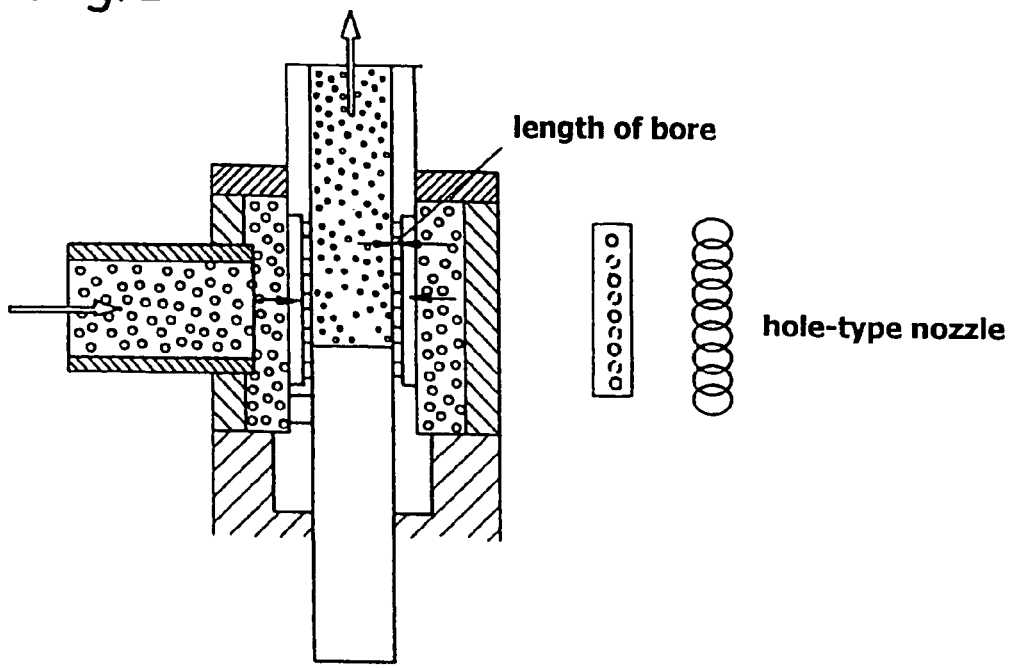
FIG. 2 describes one embodiment of the invention and shows a cross-section through a variant of the dispersing device in FIG. 1 with opposite rows of axially displaced bores. It also shows a detailed drawing of the nozzle in FIG. 2 (lateral view) in order to illustrate the geometry of the nozzle.
Figure 3:
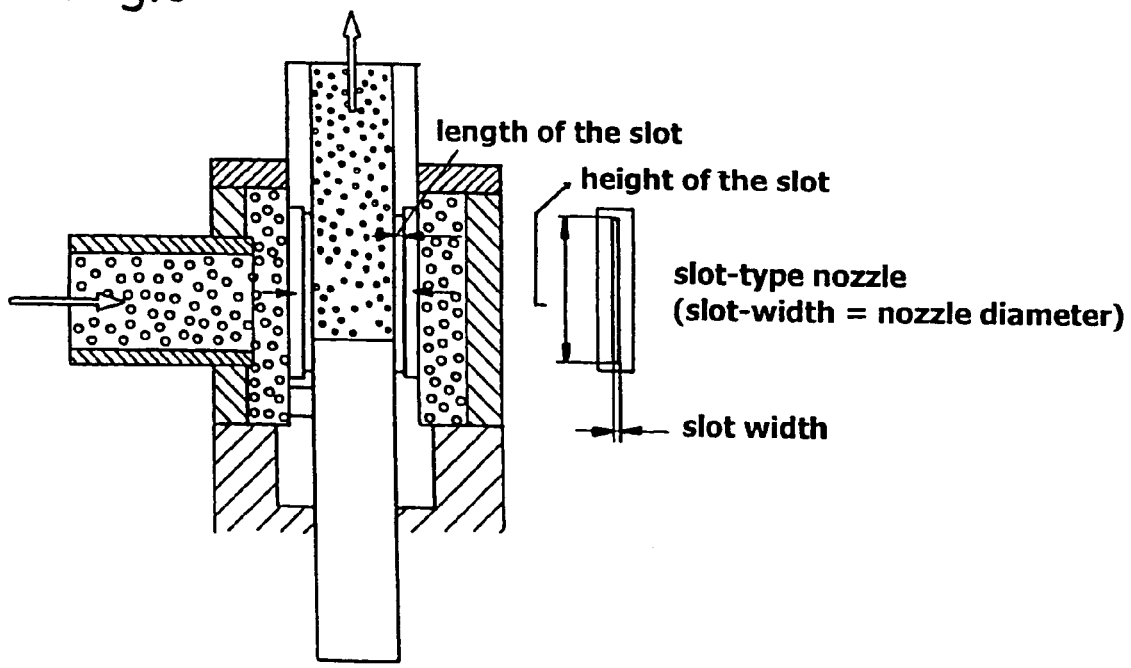
FIG. 3 describes one embodiment of the invention and shows a cross-section through a variant of the dispersing device in FIG. 1 with slots 16, 16' and it also shows a detailed drawing of the nozzle in FIG. 3 (lateral view) in order to illustrate the geometry of the nozzle.
Figure 4:
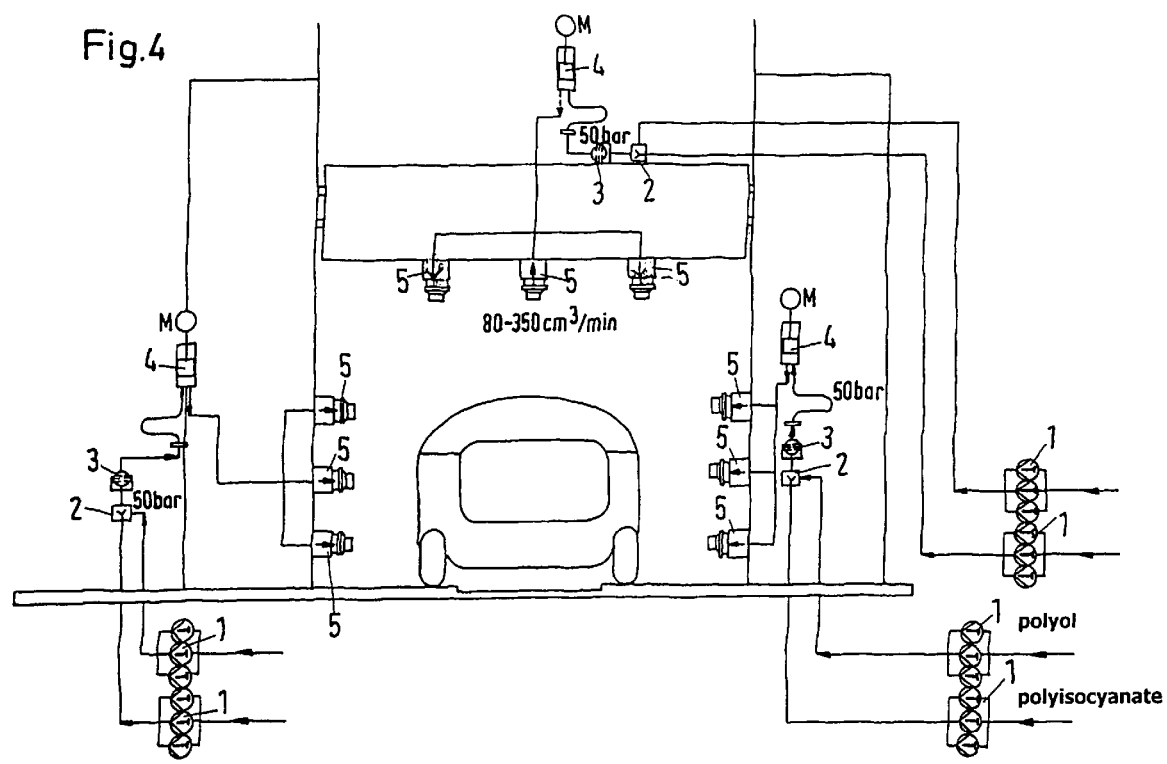
FIG. 4 describes one embodiment of the invention and shows the scheme of a coating unit with several dispersing devices according to the invention.
Figure 5:
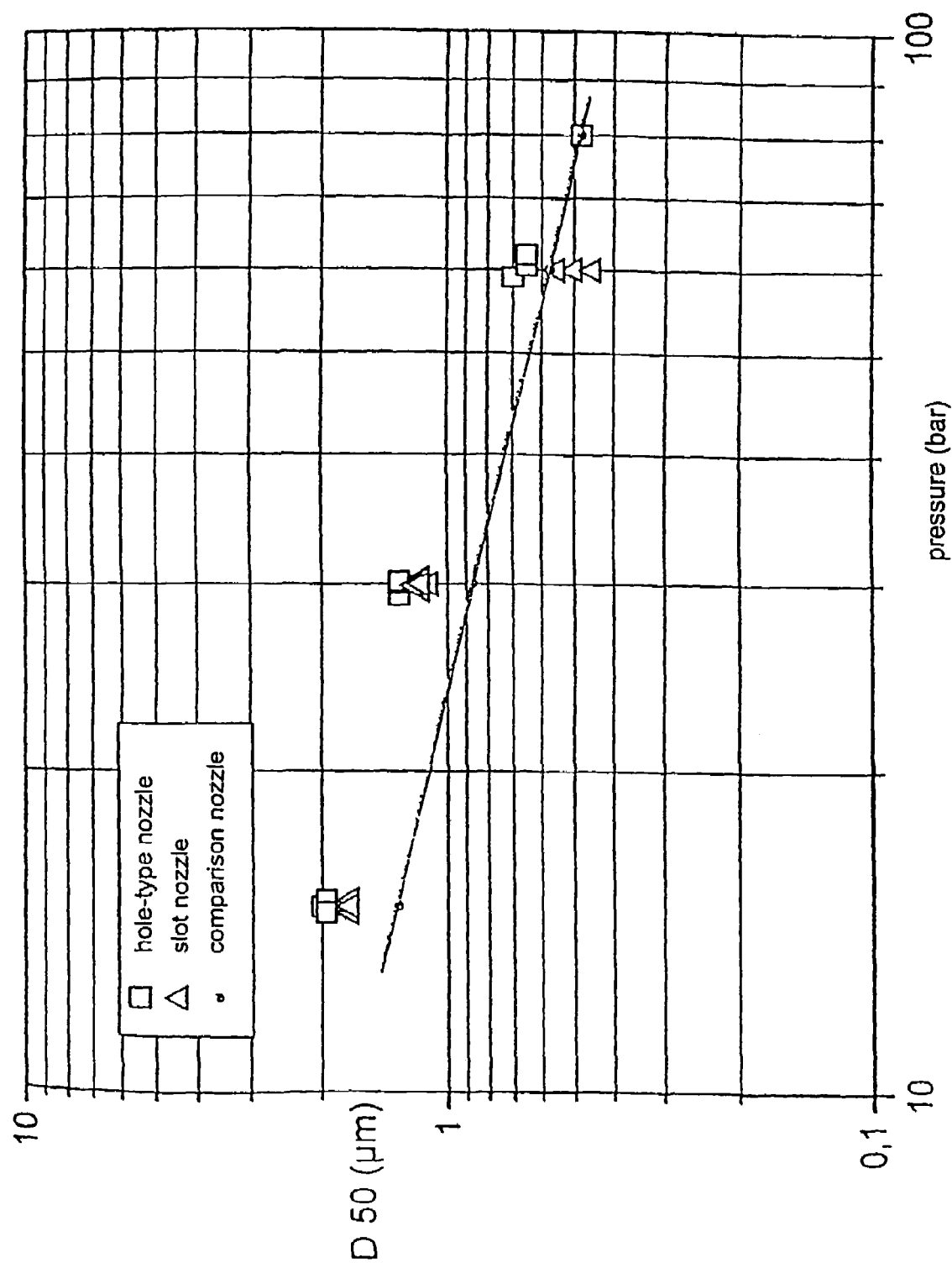
FIG. 5 describes one embodiment of the invention and shows a graph representing the average particle size as a function of the homogenizing pressure for various dispersing devices.

What is claimed is:

1. A process for the production of an aqueous two-component polyurethane coating emulsion comprising pumping a mixture of at least one polyisocyanate and an aqueous binder dispersion under a pressure of 1 to 30 MPa through a disperser, said disperser comprising:
  a) a ceramic sleeve having bores or slots in the wall thereof, with said bores or slots communicating with one end of a pipe, said pipe having an open end remote from said end communicating with said bores or slots,
    a1) said ceramic sleeve having an open end,
    a2) said ceramic sleeve further having a moveable solid ceramic piston located opposite said open end,
      a2i) with the movement of said moveable ceramic piston being such that flow through said bores or slots can be enabled or completely closed, and
      a2ii) with said movement being caused either via a pneumatic drive or an electric step motor,
wherein the ceramic sleeve and the ceramic piston are ground in to fit accurately in order to avoid leakage between the piston and the sleeve,
and wherein said mixture is pumped into the open end of said ceramic sleeve, through said bores or slots, and through said pipe.

2. The process of claim 1, wherein said bores or slots are in the form of nozzle bores or slots.

3. A process for the production of an aqueous two-component polyurethane coating emulsion comprising pumping a mixture of at least one polyisocyanate and an aqueous binder dispersion under a pressure of 1 to 30 MPa through a disperser, said disperser comprising:
  b) a ceramic sleeve having bores or slots in the wall thereof, with said bores or slots communicating with one end of a pipe, said pipe having an open end remote from said end communicating with said bores or slots,
    a1) said ceramic sleeve having an open end,
    a2) said ceramic sleeve further having a moveable ceramic piston located opposite said open end,
      a2i) with the movement of said moveable ceramic piston being such that flow through said bores or slots can be enabled or completely closed, and
      a2ii) with said movement being caused either via a pneumatic drive or an electric step motor,
wherein the ceramic sleeve and the ceramic piston are ground in to fit accurately in order to avoid leakage between the piston and the sleeve,
and wherein said mixture is pumped into said pipe, through said bores or slots and through said ceramic sleeve.

4. The process of claim 3, wherein said bores or slots are in the form of nozzle bores or slots.

* * * * *